Patented May 20, 1930

1,759,706

UNITED STATES PATENT OFFICE

NIELS D. NIELSEN, OF ELYRIA, OHIO, ASSIGNOR TO NIELSEN LABORATORIES, INC., OF ELYRIA, OHIO, A CORPORATION OF OHIO

LACTIC CITRUS PRODUCT

No Drawing.   Application filed July 18, 1927. Serial No. 206,802.

This invention relates to the production of a remedial preparation particularly applicable for treatment of obesity, composed of a lactic milk serum and de-albuminized citrus fruit juices.

Heretofore various citrus fruit juices, notably orange juice, have been utilized in the treatment of obesity, it having been ascertained that citrus fruit juices introduced into the human system have the faculty of breaking down the fatty tissues and causing such fatty tissues to be remetabolized or "burned up" by the body functions.

However, the introduction of citrus fruit juices into the human system is accompanied by several serious objections; notably, that such juices contain a substantial amount of food value in the form of albuminoids and essential oils which are fattening in themselves and defeat the purpose for which the citrus juice is introduced in the body.

A number of methods have been proposed for removing these albuminoids and oils, as by fermentation of the juice and by precipitation by heat. It is found, however, that all of the previous methods render the citrus juice unfit for sale and consumption after a very short time.

I have discovered that the objectionable oils and albuminoids may be readily precipitated from the citrus fruit juice by adding thereto a lactic milk serum which has been freed from casein and butter fat. The preferred process of preparing this lactic milk serum is disclosed in my copending application filed May 16, 1927, Serial No. 191,938. A satisfactory manner of preparation of such lactic milk serum is by inoculation of uncontaminated skim milk, fresh from the cow and before such time as harmful bacteriological reaction has commenced, with a pure strain of lactobacillus, and allowing the lactic acid forming bacteria to react with the skim milk until a 3% lactic acid acidity is reached, when it is subjected to a sterilizing heat to arrest further action.

Thus, if to 1000 c. c. of fresh orange juice, 500 c. c. or 33% by volume, of 3% acidity lactic milk serum be added, I find that the albuminoids and oils will rapidly precipitate out of the solution. The solution may then be filtered off and sterilized before any chemical action has occurred by reason of fermentation.

The albuminoid and oil free mixture of orange juice and lactic milk serum is then in condition to be introduced into the human body, where it acts to break down the fatty tissues, facilitates the metabolism of foods taken into the body and tends to remetabolize the broken down fatty tissue. Furthermore, the high acidity lactic acid content of the milk serum acts as an antiseptic and sterilizing agent in the human intestines and allows no harmful bacteria to propagate which would be injurious to health; such an antiseptic agent being especially beneficial during the period of weight reducing when the normal food intake is greatly diminished.

What I claim as my invention and desire to secure by Letters Patent is:

1. As a new product, a sterilized solution of the miscible constituents of lactic milk serum casein and fat free, de-oiled and de-albuminized citrus fruit juice having an acidity of more than 1%.

2. The method of precipitating albuminoids and essential oils from citrus fruit juices which comprises adding thereto a substantial volume of lactic milk serum of about 3% acidity.

3. The method of treating citrus fruit juices consisting of adding thereto the equivalent of 33% by volume of a 3% acidity lactic milk serum to precipitate contained albuminoids and oils, filtering off the precipitates, and sterilizing the filtrate.

In testimony whereof, I have signed my name to this specification.

NIELS D. NIELSEN.